Nov. 29, 1966    C. E. DAUGHERTY ET AL    3,288,298
ARTICULATED ALIGNING MEANS FOR FILTER MEDIA WEBS
Filed June 15, 1964    2 Sheets-Sheet 2

*INVENTOR.*
DONALD K. FLEMING
CHARLES E. DAUGHERTY
BY Robert W. Habel
ATTORNEY

United States Patent Office 3,288,298
Patented Nov. 29, 1966

3,288,298
ARTICULATED ALIGNING MEANS FOR
FILTER MEDIA WEBS
Charles E. Daugherty, Cary, and Donald K. Fleming, Arlington Heights, Ill., assignors to The Eimco Corporation, Salt Lake City, Utah, a corporation of Delaware
Filed June 15, 1964, Ser. No. 375,021
9 Claims. (Cl. 210—401)

This invention relates generally to vacuum filters of the type employing a continuous filter media web trained around at least one drum forming a filter section and rollers spaced therefrom forming a discharge section. Specifically, the invention relates to apparatus for continuously maintaining proper alignment of the filter web in relation to its path of travel through the filtering and discharge sections during operation of the filter. While the invention is particularly useful in drum filters, it has equal application in horizontal vacuum filters and other apparatus where web alignment is required.

Many devices and methods have been proposed for maintaining filter webs properly aligned and to correct deviation from proper alignment over rotary drum filters and the like. One alignment mechanism which has proved very successful comprises a web engaging device mounted on opposite sides of the filter. The device may be guide blocks having a groove through which the beaded edge of the web passes or they may take the form of paired wheels, each of which rotate on converging axes with the web passing between the wheels which engage the edge bead integral with the web. Opposing lateral forces are applied to each engaging device resulting in the web being held taut and maintained properly positioned and correctively aligned in relation to its path of travel over the filter apparatus.

Under most operating conditions the above device functions well. However, if the web becomes greatly misaligned the bead will pop out of the device. Furthermore, as to the wheeled grippers, it has been found that if either the bead or wheel surfaces become roughened, the wheels have a tendency to climb over the edge of the bead thus releasing the web from alignment pressures. An even more serious problem results from the tendency of the filter media web to stretch or shrink unevenly causing the bead to become skewed or snaked. Under such circumstances excessive pressures are placed on the aligning mechanism resulting in the bead being released. In cases where the bead is made of a thermoplastic material these problems are compounded if the bead is deformed by heat or pressures as sometimes happens during filtering of hot liquids.

Accordingly, it is a primary object of the invention to provide an improved gripper means for maintaining a traveling web properly aligned and for correcting deviations from proper alignment that eliminates the foregoing disadvantages.

An important object of the invention is to provide means for smoothly feeding an endless web to the main aligning apparatus which simultaneously acts to partially align the web and thus reduce the force required during main alignment.

Another object of the invention is to provide wheel gripper means for engaging beaded edges on endless filter webs which resist the tendency to climb the bead when either the wheel surface or bead becomes roughened after prolonged usage.

Still another object of the invention is to provide a gripper device for engaging the bead of an endless filter web which will retain the web in proper alignment and wrinkle free while preventing the bead from slipping out of the device even though it has become skewed.

The foregoing objects are satisfied in accordance with the invention by providing an articulated web engaging means on opposite sides of the filter media web which exerts opposing lateral forces on the web holding it taut and inducing corrective alignment. Each engaging means comprises paired guides or grippers mounted in tandem and interconnected by a bar and bracket means which is pivotally mounted for movement in the plane of the filter web such that the lead gripper acts to feed the bead to the second gripper which performs the main aligning function. With such an articulated device the grippers or guides have the ability to follow deviations or skewing of the bead such as caused by stretching or shrinking of the media web, while simultaneously increasing the aligning action exerted by the main aligning grippers and reducing the tendency of the bead to pop out of the device.

The grippers may comprise tandem guide blocks, each block formed from complemental blocks provided with a groove which upon assembly forms a retaining channel through which the web bead is guided and held or, in the preferred form, the grippers comprise paired wheels, two pairs mounted in tandem on each side of the filter with the web passing between the wheels and the bead engaging the peripheral surfaces thereof, the leading pair of wheels smoothly feeding and guiding the web to the main aligning pair.

In order that the invention may be more readily understood and carried into effect, reference is made to the accompanying drawings which are offered by way of example only and not in limitation of the invention, the scope of which is defined by the appended claims rather than by any preceding description.

Figure 1:
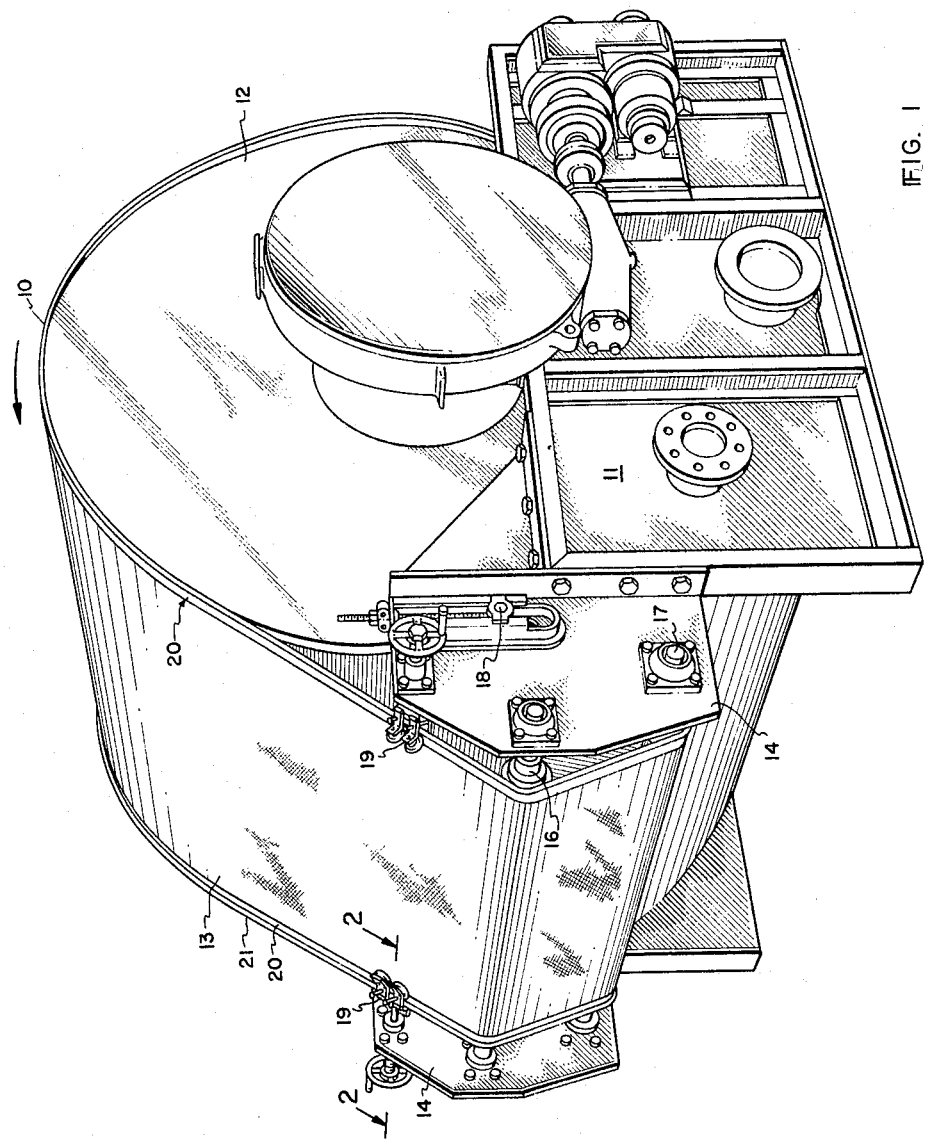
FIG. 1 is a perspective view of an endless web drum filter embodying one embodiment of the aligning device of the invention.
Figure 2:
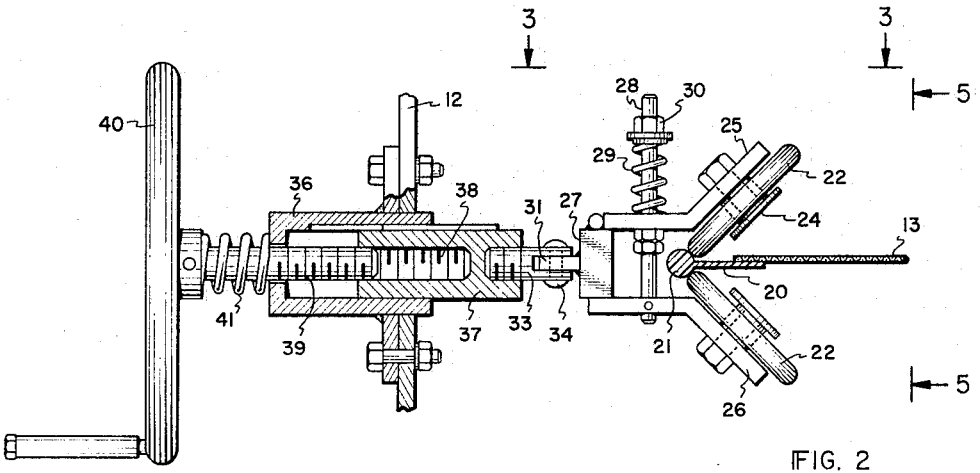
FIG. 2 is an enlarged side view of the web aligning device used in the filter shown in FIG. 1.

As illustrated in FIG. 1, the invention is embodied in a vacuum filter generally designated 10 comprising filter drum 12 mounted for rotation within feed tank 11. A suitable endless filter media web 13 is conventionally trained to successively pass around drum 12 and discharge support roll 16, spaced from the drum and journalled for rotation between end plates 14 of the filter. Additional rolls 17 and 18 may be employed as necessary to effect web washing and return the web to the drum.

Corrective alignment is induced on the web during its path of travel through the filtering and discharge sections by aligning devices 19 mounted opposite one another on each side of the web. The aligning device 19 rides on and engages a suitable edge strip 20 and associated integral edge bead 21 as will be more fully explained hereinafter.

It is desirable that the aligning device be positioned intermediate the drum 12 and discharge roll 16 or additional rolls 17 and 18. By thus placing the devices at unsupported sections of the web belt advantage is taken of the fact that minimum forces are required to maintain the web belt in proper alignment as opposed to positioning the aligning devices adjacent either the drum or rolls where a much greater force is required to overcome the frictional pressures exerted by the web against the roller or drum surfaces.

In the enlarged views of the aligning device, as shown in FIGS. 2-5, the web engaging means is provided by paired main aligning wheels 22 and paired feed wheels 23. The wheels of each pair rotate on converging axes so that the web bead 20 has the outward force more directly applied against it as it passes between the wheels.

Each wheel is journalled for rotation on shafts 24 which are in turn secured to upper and lower bracket arms 25 and 26. In the illustrated embodiment lower arms 26 are rigidly secured to bar 27 while upper arms 25 are hinged thereto enabling the upper wheels to swing freely toward and away from the bead and from the lower wheels. The wheels in each pair are held adjacent one another and against the bead by shafts 28, pivotally mounted in lower arms 26 and extending through and above upper arms 25. A spring 29 is concentrically disposed about the shaft for compression against the upper arms and is held in place by stop nut 30.

It can thus be seen that there is provided a resiliently mounted edge guide assembly which enables the rollers to separate and avoid rupture of filter media web if the lateral forces become too great on the web as might occur in extreme cases. While this is the preferred construction, the wheel mounting bracket may of course both be rigidly secured to bar 27 if a non-yielding assembly is desired.

The tandem wheel assembly is mounted to articulate or pivot in the plane of the filter media web. To this end there is provided in the illustrated embodiment pivot member 31 on bar 27 with holes 32 bored therein, enabling lateral changes in the pivot point as desired. Yoked shaft 33 engages member 31 and is secured thereto by pin 34. An outer plate and sleeve assembly 36 is bolted to the filter plate for receiving keyed shaft 37 to which yoked shaft 33 is threaded. Threaded bore 38 is provided in shaft 37 for receiving the threaded end portion of crank shaft 39 of hand crank 40. A spring 41 is positioned concentrically around shaft 39 between the hand crank and sleeve thus providing a construction in which the guide wheels 22 and 23 are normally resiliently urged outwardly against the web edge heads.

Figure 3:
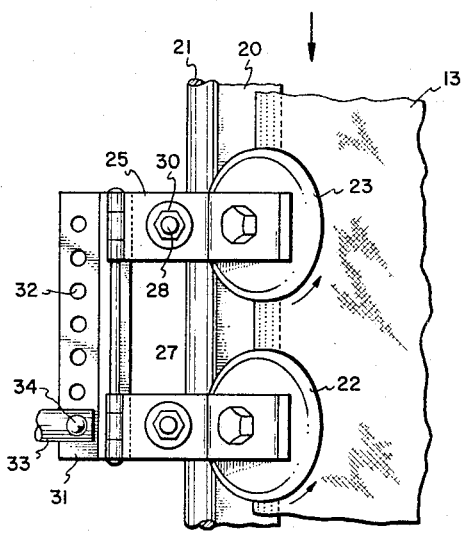
FIG. 3 is a view looking in the direction of the arrows 3 in FIG. 2.
Figure 4:
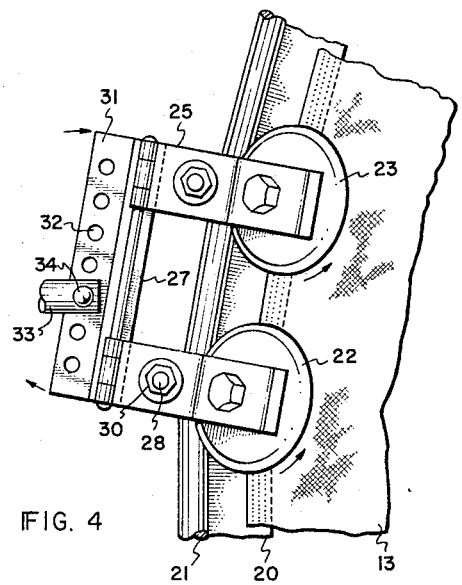
FIG. 4 is a view showing the feeding and corrective alignment action exerted on the web as it passes through the wheel assembly, the pivot point being at a different position than that of FIG. 2.
Figure 5:
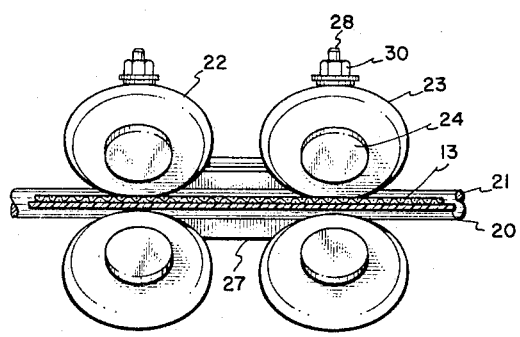
FIG. 5 is a view looking in the direction of arrows 5 in FIG. 2.

As previously noted, the wheel assemblies are mounted to pivot in the plane of the filter media web. Referring to FIGS. 3 and 4, it can thus be seen that as the edge strip 20 and attendant bead 21 pass through the aligning device in the direction of the arrow leading wheels 23 act as a guide urging and feeding the bead into the nip provided by main aligning wheels 22 thus tending to get the bead straightened out prior to main alignment of the web. In other words, if the web is greatly misaligned, as shown in FIG. 4, the leading wheels 23 provide a preliminary deflecting and aligning force on the bead and web prior to its entrance and passage between aligning wheels 22. The greater outward pressures and climbing motion which the wheels 22 normally tend to exert as a result of a wavey bead and non-aligned web are in turn counter-balanced by the action of the leading pair of wheels 23 due to the swivel action of the assembly.

These forces may vary according to the pivot point position of yoke 33 on member 31. It can thus be seen that when the pivot point is positioned as shown in FIG. 3 less pre-aligning force is exerted by feed rollers 23 on the bead than is the case where the pivot point is positioned as illustrated in FIG. 4.

The tendency of the wheels to climb the bead because of roughened contact surfaces is likewise minimized since the web is only gradually pulled into alignment by the leading guide rolls 23 thereby spreading the total force required to effect re-alignment of the web over a larger area and time interval. Sudden jerks and extreme pressures of the web against the aligning rolls are therefore diminished which reduces the tendency of the bead to pop out of the wheels or for the wheels to climb the bead.

The endless filter web aligning device thus provided maintains a continuous corrective action on the web while resisting the normal tendency of the wheel grippers to climb the bead even under extreme misalignment conditions or after prolonged use of the filter web and wheels.

We claim:

1. In a filter of the type having a filter section, a web support section spaced apart from said filter section and an endless web filter medium trained to travel successively around said filter section and said support section; the improvement comprising means for maintaining said web aligned with respect to said filter and support sections, said means comprising a continuous bead along both edges of the web, paired gripper means mounted in tandem on both sides of said filter engaging each of said web edges, said tandem pairs pivotally mounted for movement in the plane of said web, and means for urging each of said tandem pairs away from the other toward opposite sides of the filter.

2. In a filter of the type having a filter section, a web support section spaced apart from said filter section and an endless web filter medium trained to travel successively around said filter section and said support section; the improvement comprising means for maintaining said web aligned with respect to said filter and support sections, said means comprising a continuous bead along both edges of the web, two pairs of wheels mounted in tandem on said filter adjacent each of said web edges, said tandem pairs pivotally mounted for movement in the plane of said web with said web passing between the individual wheels of said tandem pairs, and means for urging each of said tandem pairs away from the other toward opposite sides of the filter.

3. In a filter of the type having a filter section, a web support section spaced apart from said filter section and an endless web filter medium trained to travel successively around said filter section and said support section; the improvement comprising means for maintaining said web aligned with respect to said filter and support sections, said means comprising a continuous bead along both edges of the web, two pairs of wheels mounted in tandem adjacent each side of said web edges, said tandem pairs of wheels located between said filter and support sections with said web passing between the individual wheels of said tandem pairs, said tandem pairs pivotally mounted for movement in the plane of the web, and means resiliently mounting each of said tandem pairs of wheels for normally urging each of said tandem pairs away from the other tandem pairs toward opposite sides of the filter.

4. In a rotary drum filter of the type having a filter section, a web support section spaced apart from said filter section and an endless web filter medium trained to travel successively around said filter section and said support section; the improvement comprising means for maintaining said web aligned with respect to said filter and support sections, said means comprising a continuous bead along both edges of the web, two pairs of wheels mounted in tandem adjacent each side of said web edges, said tandem pairs of wheels located between said filter and support sections with said web passing between the individual wheels of said tandem pairs, adjustable pivot point means for pivotally mounting said tandem pairs for movement in the plane of the web, and means resiliently mounting each of said tandem pairs of wheels for normally urging each of said tandem pairs away from the other tandem pairs toward opposite sides of the filter.

5. Web aligning means comprising continuous edge beads on said web, paired inter-connected tandemly mounted grippers on each side of the web, each pair of grippers pivotally mounted for movement in the plane of the web, the leading gripper of said tandem pairs serving as a guide for feeding the web edge to the second gripper and means for urging each of said tandem pairs away from the other.

6. Filter medium alignment apparatus for a filter having a filter section, a spaced apart cake discharge section and an endless web filter medium having continuous edge beads, said web trained to pass successively about and be supported by said filter and cake discharge sections, said alignment apparatus comprising paired inter-connected tandemly mounted grippers on each side of the web, each pair of grippers pivotally mounted for movement in the plane of the web, the leading gripper of said tandem pairs serving as a guide for feeding the web edge to the second gripper, and means for urging each of said tandem pairs apart.

7. The apparatus of claim 6 in which the pivot point of said tandem pairs of wheels is adjustable in a direction parallel to the normal path of the web.

8. The apparatus of claim 6 in which the rollers are mounted for rotation about separate axes which converge, and resilient means for normally urging said rollers together.

9. Filter medium alignment apparatus for a filter having a filter section, a spaced apart cake discharge section and an endless web filter medium having continuous edge beads, said web trained to pass successively about and be supported by said filter and cake discharge sections, said alignment apparatus comprising two pairs of inter-connected tandemly mounted wheels adjacent each side of the web, pivotally mounted for movement in the plane of the web, the leading pair of wheels of each of said tandem pairs serving as a guide for feeding the web edge to the second pair of wheels for passage between the individual wheels of each pair, and means for urging each of said tandem pairs apart.

References Cited by the Examiner
UNITED STATES PATENTS

| | | | |
|---|---|---|---|
| 1,297,064 | 3/1919 | Birch | 26—66 |
| 2,071,682 | 2/1937 | Buccicone | 26—65 X |
| 3,077,990 | 2/1963 | Peterson | 210—401 |
| 3,138,824 | 6/1964 | Brown et al. | 26—65 X |

REUBEN FRIEDMAN, *Primary Examiner.*

SAMIH ZAHARNA, *Examiner.*